United States Patent [19]

Suzuki

[11] 4,309,199

[45] Jan. 5, 1982

[54] AIR CLEANER FOR ENGINES

[76] Inventor: Nagatoshi Suzuki, 5-7-7, Kugahara, Ohta-ku, Tokyo, Japan, 146

[21] Appl. No.: 150,143

[22] Filed: May 15, 1980

[51] Int. Cl.³ .................................................. B03C 3/14
[52] U.S. Cl. ........................................ 55/127; 55/139;
55/152; 55/145; 310/339; 123/539
[58] Field of Search ................... 55/6, 127, 143, 145,
55/136–138, 152, 139, DIG. 30; 60/275, 311;
123/556, 539, 536; 310/339

[56] References Cited

U.S. PATENT DOCUMENTS

| | | | |
|---|---|---|---|
| 888,638 | 5/1908 | Morscher | 55/127 |
| 1,628,906 | 5/1927 | Byrne | 55/139 |
| 2,649,488 | 8/1953 | Harkness | 310/339 |
| 2,871,974 | 2/1959 | Werst | 55/145 |
| 3,082,333 | 3/1963 | Hufferd et al. | 310/339 |

FOREIGN PATENT DOCUMENTS 714367  7/1965  Canada .................................. 55/127

*Primary Examiner*—Bernard Nozick
*Attorney, Agent, or Firm*—Lane, Aitken, Kice & Kananen

[57] ABSTRACT

An air cleaning device constitutes of dust collecting plates and discharge plates in multi-layer assembly charged with high voltage and located in the center of the cyclone type dust collector to clean the intake air of dust particles. In addition, a high voltage charged needle is located in the intake located in the center of the plates to improve engine efficiency and to aid in cooling the intake air.

7 Claims, 4 Drawing Figures

AIR CLEANER FOR ENGINES

BACKGROUND OF THE INVENTION

1. Field of the Invention

This invention concerns a device to supply clean air to an internal combustion intake manifold by eliminating dust.

This is done by installing a cyclone type dust collector in which is disposed alternatively a series of dust collecting plates and electric discharge plates. Part of the dust particles are collected at the bottom of the cyclone duct and the remaining minute micron size dust particles are attracted to the collecting plate. In addition, an electric discharge needle is installed in the air duct to create $O_2$ oxygen ions for cooling the intake air as well as for increasing combustion efficiency, which is part of this air cleaning process.

2. Brief Description of the Prior Art

Hitherto, the air cleaning process for automotive engines was through a filter using papers in the cleaner assembly which caught dust particles and supplied clean air to the engine.

Moreover, in order to catch dust particles in the intake air of the engine, the paper filter had to have a large surface and due to the restricted space of the cleaner, a long strip of filter paper had to be folded. This naturally created considerable resistance to the air flow which adversely affected engine efficiency.

This type of paper filter sometimes did not create desirable dust catching results, it did not cool the intake air, and it decreased the amount of oxygen intake thereby reducing the engine efficiency.

SUMMARY OF THE INVENTION

The object of this invention is to do away with the disadvantages of the conventional air cleaner in the process of cleaning air by utilizing the Corona discharge effect in the dust collecting process of the engine air cleaner. Another object of this invention is to decrease the resistance to air flow by employing an electrical dust collecting process to supply clean air to the engine. This invention also incorporates a cyclone type dust collector which primarily gathers larger dust particles at the bottom of the cyclone duct prior to the air passing through the electric dust gathering device, which takes care of the smaller dust particles. There is also incorporated in the air induction duct a high voltage electrical discharge needle which creates the Corona ion cooling effect, adding to the efficiency of the engine. Furthermore, the needle is supplied with a high positive voltage, as are the discharge plates of the dust collecting assembly, which in turn are compatible with the negative ground of the engine.

Still another object of this invention is to provide a new engine intake air cleaning system in which a piezo-electric element is incorporated in the engine mechanism to convert the mechanical energy of said engine mechanism into high voltage and apply said high voltage to the discharge plate, and thereby to replace the conventional mechanical filter systems having extremely large air resistance.

BRIEF DESCRIPTION OF THE DRAWINGS

FIG. 2 (b) shows the same installation of the needle with high negative charge.

DESCRIPTION OF THE PREFERRED EMBODIMENTS

This invention displaces the hitherto used mechanical air cleaner, which offers considerable resistance to air flow, by utilizing an electrical device which collects dust particles efficiently and decreases resistance to air flow.

At the same time, this invention adds $O_2$ oxygen ions to the intake air, which increases the efficiency of fuel combustion in the engine, as well as cools the air intake, providing the means to prevent the decrease of oxygen in the intake air.

The following specific features are incorporated in this invention, which cleans intake air for the engine. A Corona discharge effect is obtained by charging dust collecting plates with high voltage, which creates an electrostatic filter effect to pick up dust particles. This device in turn is placed in the cyclone dust collector and the charged plates are positioned to provide the least resistance to air flow. Together with the Corona effect, which ionizes oxygen, as well as cools of the intake air and prevents the decrease of oxygen content, this electric air cleaner offers an ideal type of air cleaner which thoroughly gets rid of dust and increases engine efficiency.

The supply of $O_2$ oxygen ions is further enhanced by locating a discharge needle in the cleaned air flow, which also contributes to the cooling effect.

Figure 1:
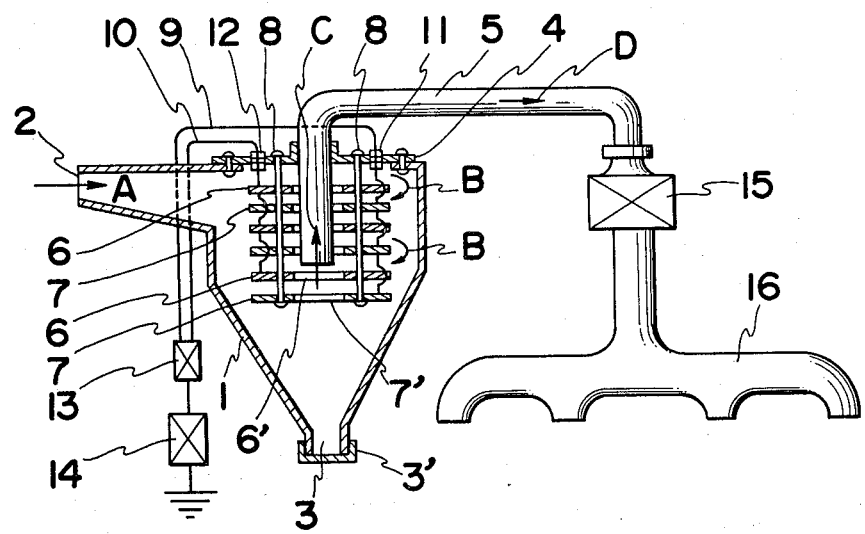
FIG. 1 demonstrates an appropriate example of the air cleaner for engines of the present invention, and shows a cross section of the cyclone duct.

The following is a further explanation of this air cleaning system, utilizing the accompanying drawings. FIG. 1 shows a suitable application of the system. A cyclone duct has a main body 1 having an intake 2 and a collecting area 3 with a cover for the removal of dust. A removable cover 4 attached to the main body 1 has insulated bolts 8 suspending a plurality of dust collector plates 6 and discharge plates 7 in spaced, alternating positions within the main body 1. The dust collector plates 6 and the discharge plates 7 have openings 6' and 7', respectively, concentric with the center line of the cyclone duct. A high voltage generator 14, such as an ignition coil, is connected through a rectifier 13 and high tension cords 9 and 10 to apply positive charge to the dust collector plate 6 and negative charge to the discharge plates 7 to define the static filter in the cyclone duct. An air outlet in the form of an induction pipe 5 connects the main body 1 with a carburetor or fuel injection unit 15.

This electrostatic filter requires very little electric current and can be obtained by employing a voltage generator 14 similar to a high tension coil, but better results can be obtained by using a piezo-electric ceramic transformer.

Figure 3:
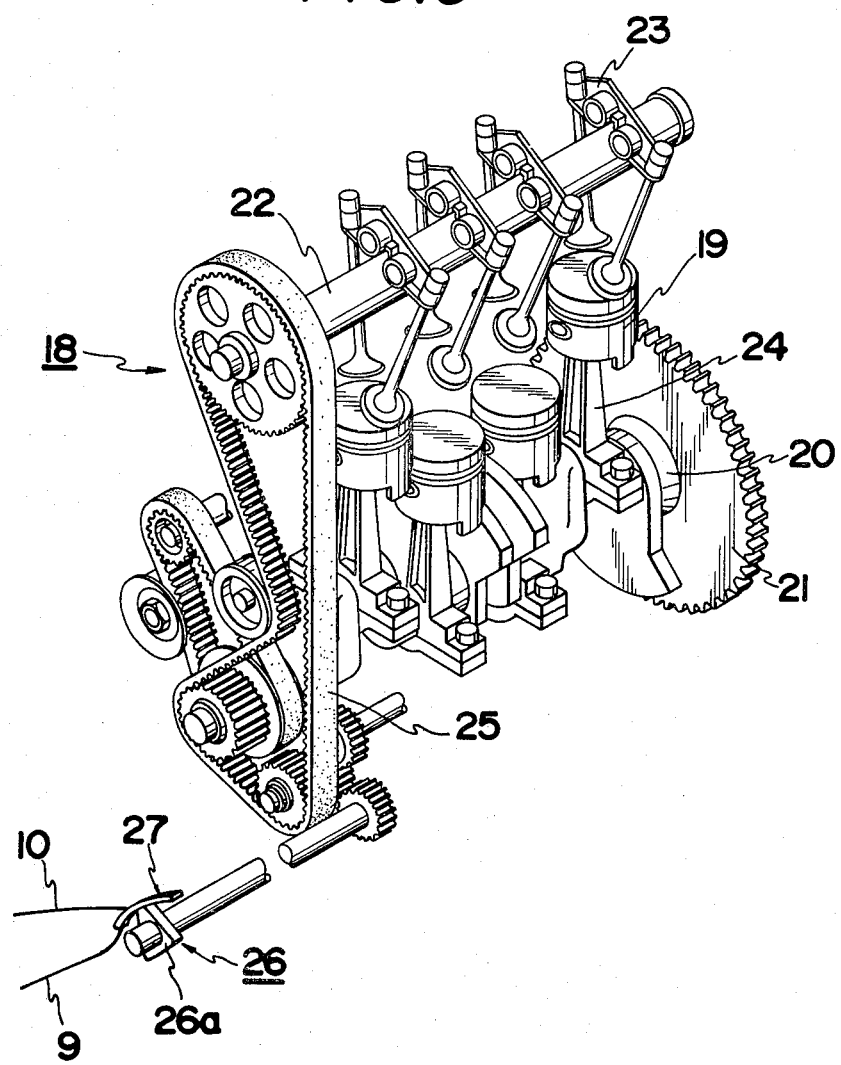
FIG. 3 is a perspective view of the engine mechanism in which the piezo-electric element is incorporated.

FIG. 3 shows a total view of the engine mechanism 18 which comprises a piston 19, a crank shaft 20, a fly wheel 21, a cam shaft 22, a rocker arm 23, a connecting rod 24, a timing chain 25, etc.

FIG. 3 illustrates a 4-cylinder engine mechanism. By starting up the engine, the piston 19 and the connecting rod 24 move up and down and rotate the crank shaft 20. Then a piezo-electric cam 26 which is engaged with the crank shaft gear is turned to intermittently press the tip portion 26a of said piezo-electric cam 26 against the surface of the piezo-electric element 27 and produce the piezo-electric effect. More specifically, the piezo-electric transverse effect is produced to generate high voltage on the high voltage wires 9 and 10. Such a high voltage is applied on the said dust collecting plates 6 and the discharge plates 7 to remove dust from the air.

Furthermore the timing chain 25 is engaged with the gear of the cam shaft 22 and makes the adjustment of the inlet valve and the exhaust valve provided at the rocker arm 23.

This invention is not limited to the embodiment mentioned above but covers all the contrivances where a piezo-electric element is arranged at a part of the engine mechanism and where the mechanical energy of said engine mechanism is converted into pressure force to press the surface and the back of said piezo-electric element.

Furthermore the said piezo-electric element may of course be extended. In other embodiments, therefore, the said piezo-electric element may also be located in the cylinder, etc.

The carburetor or fuel injection unit 15 of the engine is connected with the induction pipe 5 which passes through the cover 4 into the center of the filter element assembly. The reference numeral 16 indicates the intake manifold.

When this system is applied to the engine air intake, air is sucked through the intake 2 in the direction of the arrow "A" and large particles of dust are gathered at the bottom 3 of the cyclone duct 1. Finer dust particles pass through the plates 6 and 7 in the direction of the arrow "B" and through the induction pipe 5, the cleaned air flows in the direction of the arrows "C" and "D" into the carburetor 15. There is no obstruction to air flow such as caused by paper filter in conventional air cleaners and, thus, air flows freely in this system.

Figure 2A:
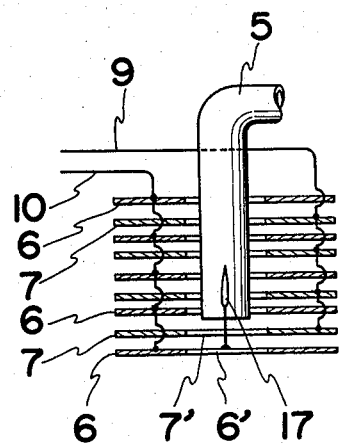
FIG. 2 (a) shows the installation of the high voltage positive discharge needle in the air induction duct, together with the dust collecting device.
Figure 2B:
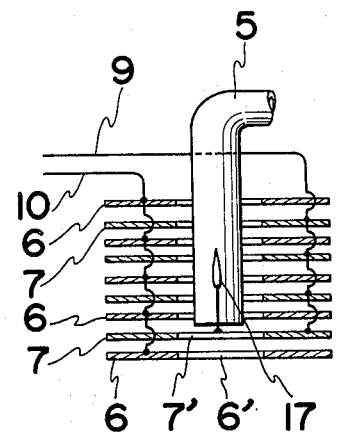

Another embodiment of this invention will be explained by referring to FIGS. 2a and 2b. The passage of air through the cyclone the duct, dust collector plates 6 and 7 and the induction pipe 5 leading to the carburetor 15, as explained in FIG. 1, is similar to FIG. 2a with the exception that a high voltage discharge needle 17 has been added. FIG. 2a has a positively charged needle and FIG. 2b shows a negatively charged needle. The object of these needles is the creation of $O_2$ oxygen ions to improve the combustion process in the cylinder and the cooling effect of the Corona ion wind. For cooling purposes, a negatively charged needle is better. When EGR is applied to lessen $NO_x$ in the exhaust, the intake temperature sometimes goes up as high as 200° C. to 300° C. Therefore, decreasing the temperature by approximately 100° C. by the action of this negatively charged needle is very effective.

For the creation of $O_2$ oxygen ions for improved combustion and more efficient dust collecting capability, the positively charged needle is superior. By experiment it was found that the positively charged needle showed 20% more dust collecting capability than the negatively charged needle.

The following are the results of the experiments conducted.

(1) ENGINE SPECIFICATION a. Engine horsepower, 100
b. Diameters of the dust collecting and discharging plates, from 300 mm to 500 mm
c. Space between plates, approx. 5 mm
d. Discharge plate and needle voltage, from 5,000 to 25,000.
e. Actual voltage range applied to the collector and discharge plates 16,000 to 17,000.

(2) EFFICIENCY OBTAINED a. Approx. 5% saving in fuel.
b. Approx. 5% improvement in engine output.

Another advantage of this system is that instead of changing paper filter elements as in conventional air cleaners, the plate assembly can be removed from the cyclone body 1 and cleansed either by blowing compressed air across the surface or by washing it in cleansing liquid. Thus, the air cleaning element can be used semipermanently.

According to this invention, a piezo-electric element is arranged at a part of the engine mechanism and the mechanical energy of the engine is imposed on the said piezo-electric element to produce high voltage on the surface and the back of the said piezo-electric element by the so-called piezo-electric effect, so that no special equipment such as a high voltage generator, a rectifier, etc. are necessary and, through such rational utilization of energy, a high quality and compact air cleaner for engines can be provided.

What is claimed is:

1. An air cleaning device for internal combustion engines comprising a cyclone duct having a wide air intake, an air outlet and a narrow dust-collecting portion opposite to said air intake, an electrostatic filter mounted within said duct coaxially to the axis of said duct, between said air intake and the air outlet, and having plural dust collecting plates and plural discharge plates, wherein said dust collecting plates and discharge plates are alternately disposed with a predetermined interval therebetween and are arranged perpendicular to said axis of said duct, and means for applying an electrostatic charge to said dust collecting plates and discharge plates.

2. An air cleaning device for internal combustion engines, comprising a cyclone duct having a wide air intake and a narrow dust-collecting portion opposite to said air intake, an electrostatic filter mounted within said duct coaxially to the axis of said duct and having plural dust collecting plates and plural discharge plates, wherein said dust collecting plates and discharge plates are alternately disposed with a predetermined interval therebetween and are arranged perpendicular to said axis of said duct, an induction pipe disposed coaxially to the axis of said duct for guiding air to be sucked into the engine, a discharge needle disposed in said induction pipe, and means for applying high voltage to said dust collecting plates, discharge plates and discharge needle.

3. The air cleaning device of claim 1 or claim 2 wherein each of said dust collecting plates and discharge plates has an opening defining a flow passage for the air.

4. An air cleaning device for an internal combustion engine comprising a cyclone dust collection duct having an air intake and a dust-collecting portion at the lower part thereof; an electrostatic filter mounted within said duct and having dust collecting plates and discharge plates; an induction pipe for guiding the air cleaned within the said cyclone dust-collecting duct into the inlet of the engine, said electrostatic filter being mounted between the air intake and the induction pipe; and means for applying a high voltage to the electrostatic filter, said means comprising a piezo-electric element engageable by a part of the engine.

5. An air cleaning device for internal combustion engines according to claim 4 wherein said piezo-electric element is made of crystal or tourmaline.

6. An air cleaning device for internal combustion engines according to claim 4 wherein a cam is engaged with the crank shaft of the engine, and, at the same time, said piezo-electric element is arranged adjacent to said cam so that said cam presses against said piezo-electric element.

7. An air cleaning device for internal combustion engines according to claim 4 wherein a discharge needle is installed in said induction pipe to generate oxygen $O_2$ ions.

* * * * *